US006811208B1

(12) United States Patent
Kettinger

(10) Patent No.: US 6,811,208 B1
(45) Date of Patent: Nov. 2, 2004

(54) SELF-CAMMING TORQUE ROD ASSEMBLY FOR VEHICLES

(75) Inventor: James N. Kettinger, Highland, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/631,307

(22) Filed: Jul. 31, 2003

(51) Int. Cl.[7] .................................................. B60J 5/10

(52) U.S. Cl. .............................. 296/146.8; 296/146.12; 296/57.1

(58) Field of Search ............................ 296/146.8, 57.1, 296/50, 76, 146.12, 51; 49/386, 502

(56) References Cited

U.S. PATENT DOCUMENTS

| | | | | |
|---|---|---|---|---|
| 3,336,070 A | * | 8/1967 | Jackson | 296/57.1 |
| 3,387,406 A | * | 6/1968 | Coker et al. | 49/192 |
| 3,476,375 A | * | 11/1969 | Brasseur | 267/277 |
| 3,695,678 A | * | 10/1972 | Gergoe | 296/76 |
| 4,143,904 A | * | 3/1979 | Cooper et al. | 296/57.1 |
| 4,856,142 A | * | 8/1989 | Fukunaga | 16/298 |
| 5,195,796 A | * | 3/1993 | Wampler, II | 296/76 |
| 5,730,239 A | * | 3/1998 | Holter | 180/69.21 |
| 5,951,088 A | * | 9/1999 | Schoen et al. | 296/76 |
| 5,988,724 A | * | 11/1999 | Wolda | 296/57.1 |
| 6,070,929 A | * | 6/2000 | Barkley | 296/76 |
| 6,619,723 B2 | * | 9/2003 | Duffy | 296/146.11 |
| 6,637,796 B1 | * | 10/2003 | Westerdale et al. | 296/57.1 |

* cited by examiner

*Primary Examiner*—D. Glenn Dayoan
*Assistant Examiner*—G Blankenship
(74) *Attorney, Agent, or Firm*—Laura C. Hargitt

(57) ABSTRACT

A self-camming torque rod assembly for an endgate of a vehicle includes a dual-pivot hinge assembly connected to the endgate and a vehicle body of the vehicle and having a dual pivot to allow the endgate to pivot to a first open position and a second open position and to a closed position relative to the vehicle body. The self-camming torque rod assembly also includes a roller rotatably connected to the dual-pivot hinge assembly. The self-camming torque rod assembly further includes a self-camming torque rod to interface with the roller having a first portion for connection to the endgate and a second portion extending from the first portion and spaced from the roller when the endgate is in the closed position and cooperating with the roller when the endgate is moved between the closed position and the first open position and the second open position to counterbalance a weight of the endgate.

23 Claims, 5 Drawing Sheets

SELF-CAMMING TORQUE ROD ASSEMBLY FOR VEHICLES

TECHNICAL FIELD

The present invention relates generally to endgates for vehicles and, more particularly, to a self-camming torque rod assembly for an endgate of a vehicle.

BACKGROUND OF THE INVENTION

It is known to provide vehicles such as a sport utility vehicle with a closure such as an endgate attached to a longitudinal end of the vehicle. The endgate is typically hinged to vehicle structure such as the vehicle body of the vehicle with at least one hinge to allow pivotal movement of the endgate. The endgate typically includes a latching mechanism to secure the endgate to the vehicle body when closed.

The endgate can rotate up and down about a horizontal axis, referred to as a "drop mode". During the drop mode, a torque rod counter-balances the weight of the endgate to reduce the amount of effort that the user must use to lower or raise the endgate. Typically, the torque rod is straight and a roller attached to the vehicle body interfaces with the torque rod. As a result, the torque rod may be loaded when the endgate is in the closed position. In addition, the straight torque rod requires increasing lift from an operator to raise the endgate, which is undesired.

Therefore, it is desirable to provide a new torque rod for an endgate of a vehicle. It is also desirable to eliminate a straight torque rod for an endgate of a vehicle. It is further desirable to provide a torque rod for an endgate of a vehicle which reduces operator lift effort on the endgate. Thus, there is a need in the art to provide a torque rod assembly for a vehicle that meets these desires.

SUMMARY OF THE INVENTION

It is, therefore, one object of the present invention to provide a new torque rod assembly for a vehicle.

It is another object of the present invention to provide a torque rod assembly for a vehicle that eliminates a straight torque rod and reduces lift effort for an endgate of the vehicle.

To achieve the foregoing objects, the present invention is a self-camming torque rod assembly for an endgate of a vehicle. The self-camming torque rod assembly includes a dual-pivot hinge assembly connected to the endgate and the vehicle body of the vehicle and having a dual pivot to allow the endgate to pivot to a first open position and a second open position and to a closed position relative to the vehicle body. The self-camming torque rod assembly also includes a roller rotatably connected to the dual-pivot hinge assembly. The self-camming torque rod assembly further includes a self-camming torque rod to interface with the roller having a first portion for connection to the endgate and a second portion extending from the first portion and spaced from the roller when the endgate is in the closed position and cooperating with the roller when the endgate is moved between the closed position and the first open position and the second open position to counterbalance a weight of the endgate.

One advantage of the present invention is that a self-camming torque rod assembly is provided for an endgate of a vehicle. Another advantage of the present invention is that the self-camming torque rod assembly incorporates a self-camming torque rod to eliminate a straight torque rod. Yet another advantage of the present invention is that the self-camming torque rod assembly reduces operator lift effort of the endgate. Still another advantage of the present invention is that the self-camming torque rod assembly cooperates with a dual-pivot hinge assembly and is manufacturable with current spring steel and processes. A further advantage of the present invention is that the self-camming torque rod assembly allows operator maximum lift effort to occur at a more advantageous endgate drop angle. Yet a further advantage of the present invention is that the self-camming torque rod assembly prevents a body-mounted roller from contacting the torque rod when the endgate is in the closed position and does not create a load on the torque rod.

Other objects, features, and advantages of the present invention will be readily appreciated, as the same becomes better understood, after reading the subsequent description taken in conjunction with the accompanying drawings.

DESCRIPTION OF THE PREFERRED EMBODIMENT

Figure 1:
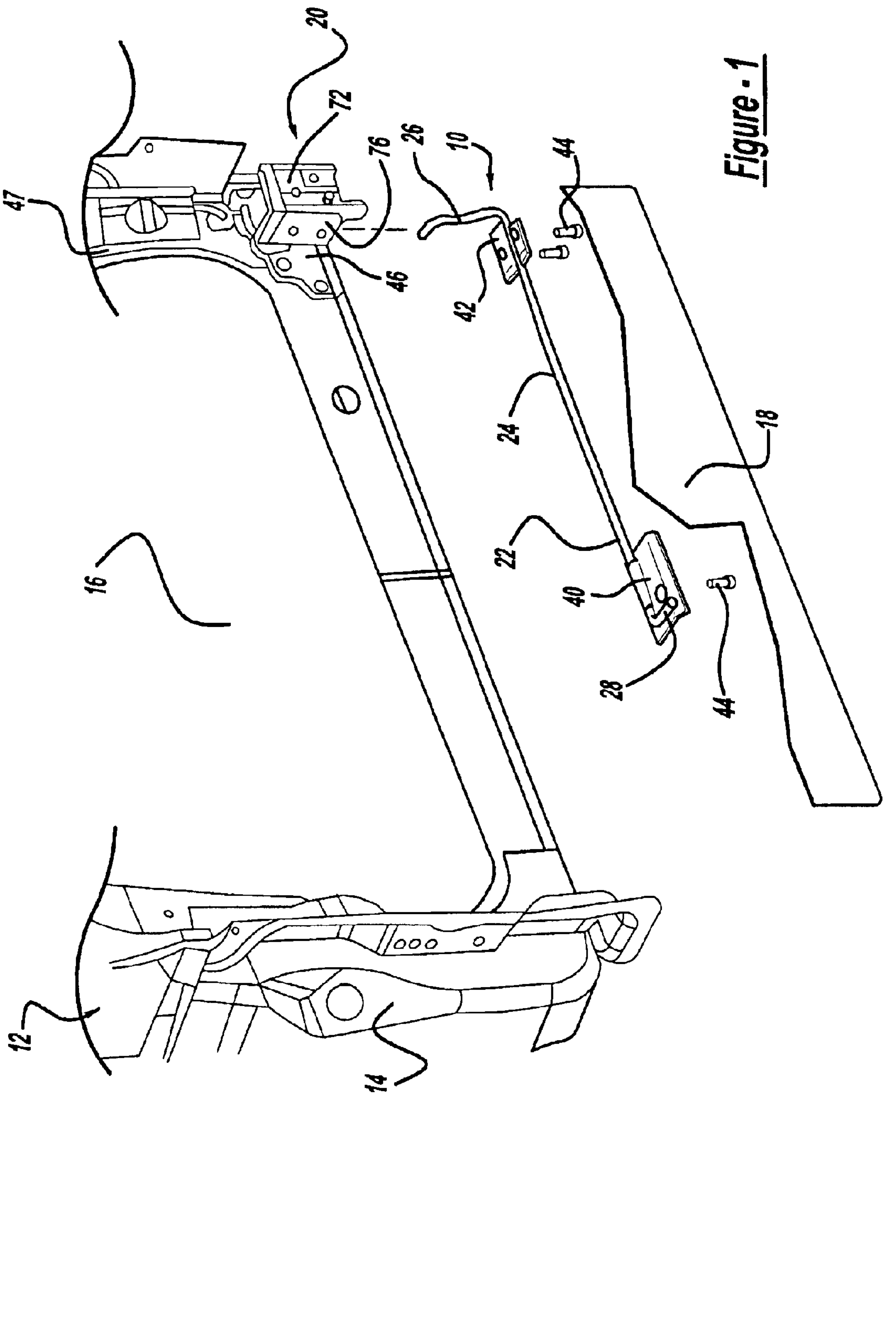
FIG. 1 is an exploded perspective view of a self-camming torque rod assembly, according to the present invention, illustrated in operational relationship with a vehicle.
Figure 2:
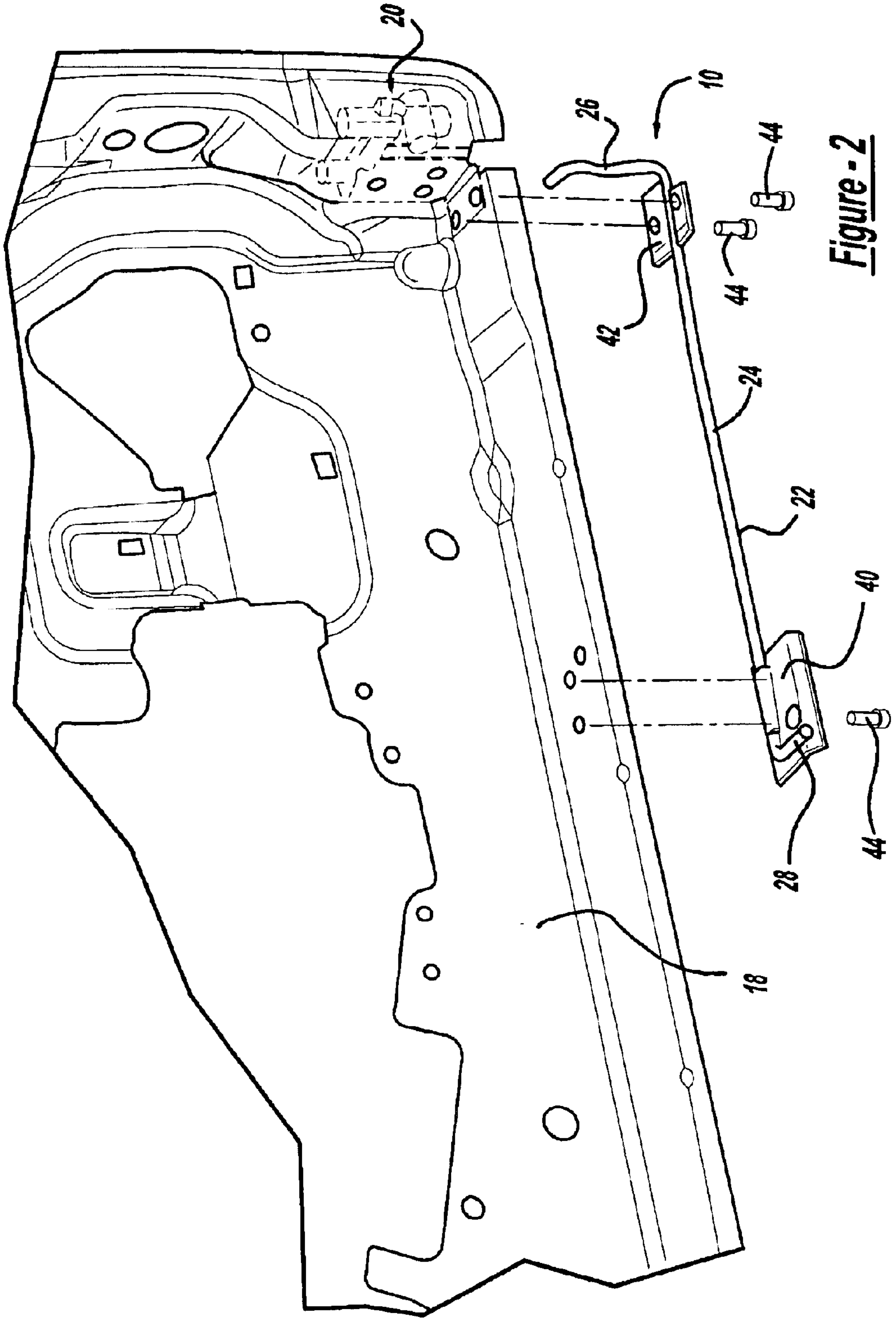
FIG. 2 is an exploded perspective view of a self-camming torque rod assembly and endgate of the vehicle of FIG. 1.

Referring to the drawings and in particular FIGS. 1 through 5, one embodiment of a self-camming torque rod assembly 10, according to the present invention, is shown for a vehicle (partially shown), such as a sport utility type motor vehicle, generally indicated at 12. The vehicle 12 includes vehicle structure such as a vehicle body 14 having an opening 16 at a longitudinal rear end thereof. The vehicle 12 also includes an openable member such as an endgate 18 (partially shown) pivotally attached to one side of the vehicle body 14 by a dual-pivot hinge assembly, generally indicated at 20, to open and close the opening 16. The dual-pivot hinge assembly 20 is similar to that disclosed in copending application Ser. No. 10/213,932, filed Aug. 7, 2002, the disclosure of which is hereby incorporated by reference. It should be appreciated that only one dual-pivot hinge assembly 20 is needed for the endgate 18.

The vehicle 12 includes the self-camming torque rod assembly 10, according to the present invention, interconnecting the dual-pivot hinge assembly 20 and the endgate 18 to assist an operator in raising and lowering the endgate 16. The self-camming torque rod assembly 10 includes a torque rod 22 extends laterally and is generally circular in cross-sectional shape. The torque rod 22 has a base portion 24 extending laterally, an arm portion 26 at one end of the base portion 24 and extending generally perpendicular to the base portion 24, and a foot portion 28 at the other end of the base portion 24 and extending generally perpendicular to the base portion 24. The arm portion 26 includes a first linear portion 30 extending forwardly and upwardly from the base portion 24, a second linear portion 32 extending rearwardly and upwardly from the first linear portion 30, and a first arcuate portion 34 interconnecting the first linear portion 30 and the second linear portion 32 for a function to be described. The arm portion 26 also includes a third linear portion 36 extending forwardly and upwardly from the second linear portion 34 and a second arcuate portion 38 interconnecting the third linear portion 36 and the second linear portion 32 for a function to be described. The torque rod 22 is made of a spring-like material, preferably a spring-like metal material such as spring steel. The torque rod 22 is formed by conventional processes such as bending. It should be appreciated that the torque rod 22 is a monolithic structure being integral, unitary, and one-piece.

The vehicle 12 includes a fixed end bracket 40 and a trunnion bracket 42 laterally spaced and connected to the torque rod 22 for connection to a bottom of the endgate 18. The fixed end bracket 40 is permanently connected to the foot portion 28 of the torque rod 22 and imparts torque to the endgate 18 to assist an operator (not shown) during opening and closing operations (i.e., the endgate 18 rotates about a hinge drop or horizontal axis 56). The trunnion bracket 42 is disposed over the base portion 24 and permits rotation between the torque rod 22 and the endgate 18 when load is applied to the torque rod 22 by a body-mounted roller 68 to be described. The vehicle 12 further includes at least one, preferably a plurality of fasteners 44 to extend through the brackets 40 and 42 and secure the torque rod 22 to the bottom of the endgate 18. It should be appreciated that, except for the self-camming torque rod assembly 10, the vehicle 12 is conventional and known in the art.

Referring to FIGS. 1 through 5, the dual-pivot hinge assembly 20 includes a body bracket 46 connected to a rear pillar 47 of the vehicle body 14 by suitable means such as fasteners (not shown). The dual-pivot hinge assembly 20 also includes a universal bracket 48 disposed between flanges 49 of the body bracket 46. The universal bracket 48 has a body portion 50 that is generally cylindrical in shape and has a generally circular cross-sectional shape. The body portion 50 has a vertical axis 52 for rotation thereabout. The body portion 50 is connected to the flanges 49 by suitable means such as fasteners (not shown) to allow rotation of the body portion 50 about the vertical axis 52. It should be appreciated that the body bracket 46 is fixed or stationary and the body portion 50 rotates relative thereto.

The universal bracket 48 has an endgate portion 54 extending laterally and generally perpendicular from the body portion 50. The endgate portion 54 is generally cylindrical in shape and has a generally circular cross-sectional shape. The endgate portion 54 has a hinge drop or horizontal axis 56 for rotation thereabout.

The universal bracket 48 also has a hinge arm 60 extending longitudinally and laterally from the body portion 50. The hinge arm 60 has a top wall 62 that is generally planar and rectangular in shape. The hinge arm 60 has a pair of laterally spaced side walls 64 extending generally vertically and perpendicularly from the top wall 62. The top wall 62 has an elongated aperture 66 extending therethrough.

The dual-pivot hinge assembly 20 includes a roller 68 disposed in the aperture 66 in the top wall 62 of the universal bracket 48. The roller 68 is generally circular in shape and has a groove or channel (not shown) circumferentially thereabout to receive the arm portion 26 of the torque rod 22. The roller 68 is rotatably secured to the hinge arm 60 by suitable means such as a pin 70 extending through the roller 68 and the side walls 64 of the hinge arm 60. The roller 68 is made of a rigid material, preferably a metal material such as steel. It should be appreciated that the torque rod 22 cooperates with the roller 68 to rotate the roller 68 as the arm portion 26 of the torque rod 22 moves up and down. It should also be appreciated that when the endgate 18 is in the "closed" position, the roller 68 does not contact the torque rod 22 and does not create load on the torque rod 22.

The dual-pivot hinge assembly 20 also includes an intermediate bracket 72 pivotally connected to the universal bracket 50 by suitable means such as fasteners. The dual-pivot hinge assembly 20 also includes a gate side bracket 76 connected to the intermediate bracket 72 and the endgate 18 by suitable means such as fasteners. It should be appreciated that the endgate 18 rotates relative to the endgate portion 54.

Figure 3:
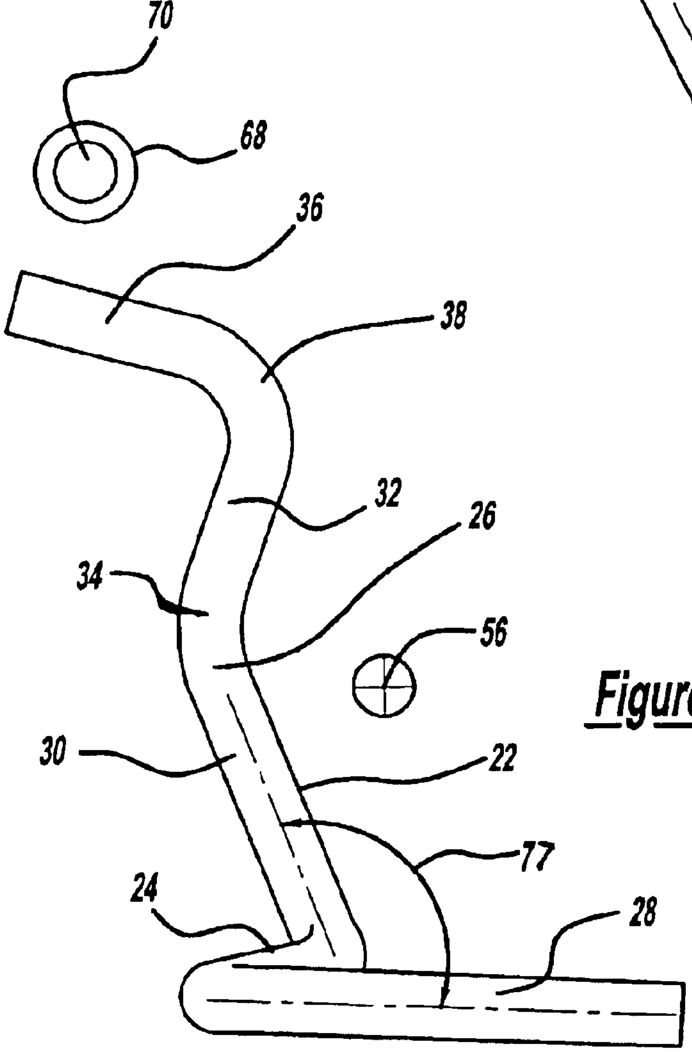
FIG. 3 is an enlarged left side elevational view of a portion of the self-camming torque rod assembly of FIG. 1 illustrating a first operational position.
Figure 5:
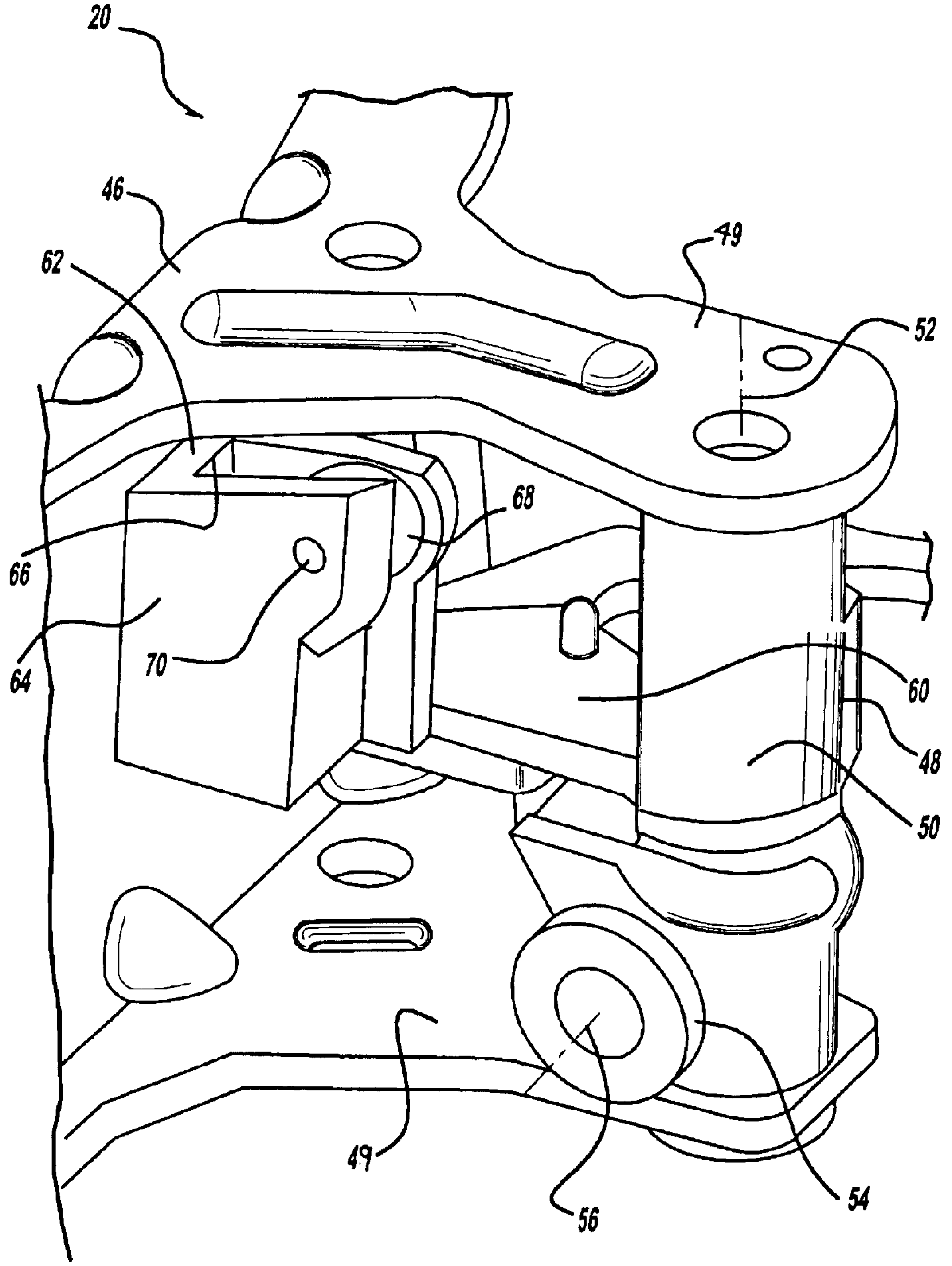
FIG. 5 is a perspective view of a portion of the self-camming torque rod assembly of FIG. 1.

In operation, the endgate 18 can either rotate sideways about the vertical axis 48, referred to as a "swing mode", or up and down about the horizontal axis 56, referred to as a "drop mode". When the endgate 18 is in a closed position, the torque rod 22 does not contact the roller 68 and the roller 68 does not create a load on the torque rod 22 as illustrated in FIG. 3. In the closed position, the drop angle of the endgate 18 is at zero degrees and a torque rod angle 77 is formed between the axis of the foot portion 28 and the axis of the first linear portion 30. It should be appreciated that pivot control is accomplished with torque rod 22 and roller 68 rigidly attached to the brackets 46 and 50. It should further be appreciated that the torque rod angle 77 is that of its free state.

Figure 4:
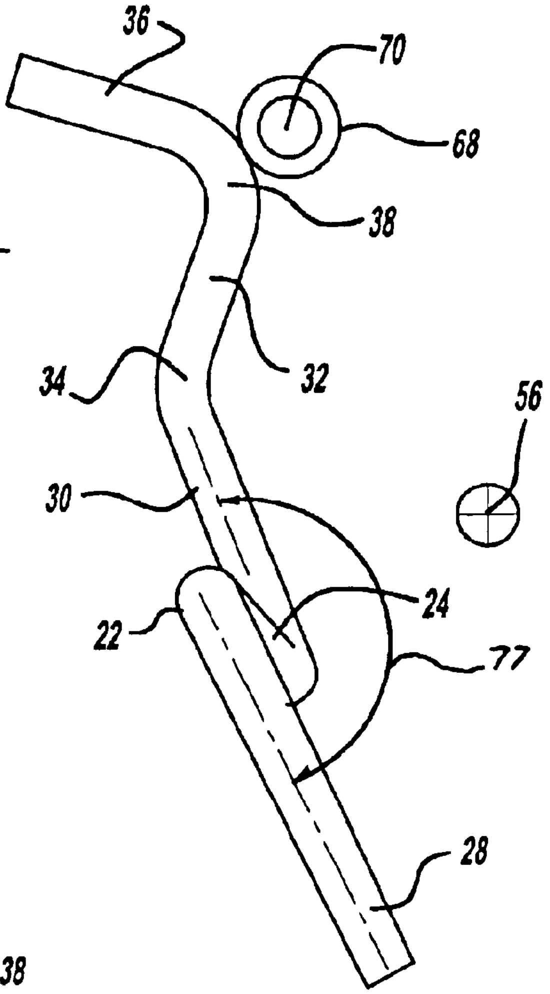
FIG. 4 is a view similar to FIG. 3 of the self-camming torque rod assembly of FIG. 1 illustrating a second operational position.

To open the endgate 18, a handle (not shown) upon the endgate 18 is actuated to release a latch (not shown) from a latch member (not shown) and the endgate 18 is pivoted about either the vertical axis 48 or the horizontal axis 56. During the drop mode, the torque rod 22 counter-balances the weight of the endgate 18 to reduce the amount of effort that a user must use to lower or raise the endgate 18. The arm portion 26 of the torque rod 22 contacts the roller 68 as the endgate 18 is dropped or opened and remains in contact to a dropped position as illustrated in FIG. 4. Specifically, the third linear portion 36 first contacts the roller 68 as the endgate 18 is rotated or pivoted, and the third linear portion 36 cams or moves along the roller 68 until the second arcuate portion 38 contacts the roller 68. As the endgate 18 rotates about the horizontal axis 56, the lower part or base portion 24 of the torque rod 22 moves with the endgate 18, but the arm portion 26 is prevented from rotating, which creates the torque to counter-balance the weight of the endgate 18. As illustrated in FIG. 4, the drop angle of the endgate 18 is approximately sixty degrees (60°). The torque rod angle 77 is greater than that of its free state. The torque imparted to the endgate 18 follows from the public-domain equation:

Torque=Angle of twist*Polar area moment of inertia*Material shear modulus/Length It should be appreciated that the Angle of twist or torque rod angle 77 is greater for a curved rod (self-camming geometry) than for a straight rod. It should also be appreciated that a greater Angle of twist or torque rod angle creates greater Torque. It should further be appreciated that the arm portion 26 of the torque rod 22 can move up or down as the roller 68 rotates about its axis or the pin 70. It should still further be appreciated that the arm portion 26 of the torque rod 22 is free to move up or down to prevent binding, but it does not rotate as does the endgate 18 about the horizontal axis 56.

During the swing mode, the roller 68, which is attached to the hinge arm 60 of the universal bracket 48, rotates with the body portion 50 about the vertical axis 52. As a result, the roller 68 does not inhibit the swing mode of the endgate 18. It should be appreciated that the arm portion 26 of the torque rod 22 remains in the same relative position to the roller 68 as the endgate 18 is swung or opened.

Figure 6:
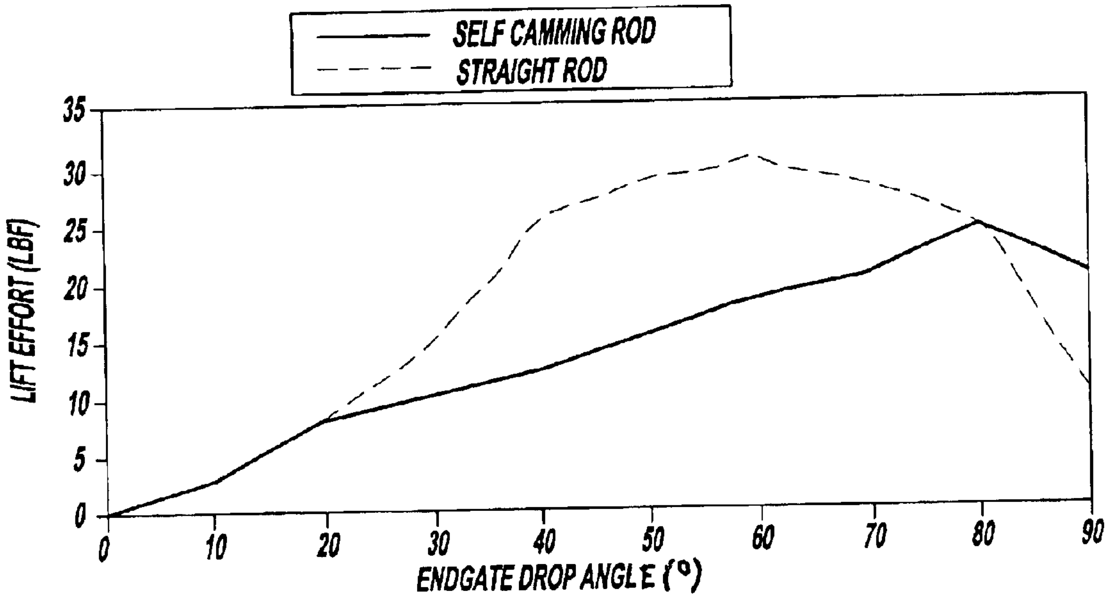
FIG. 6 is a graph of lift effort versus endgate drop angle for a straight torque rod and a self-camming torque rod of the self-camming torque rod assembly of FIG. 1.

Referring to FIG. 6, a graph of lift effort versus endgate drop angle is shown for a conventional straight torque rod and the self-camming torque rod 22. The graph depicts measured data on the vehicle 12 in which the torque rod was the only variable. The advantages of the self-camming torque rod 22 are: 1) the maximum customer lift effort occurs when the endgate 18 is almost full dropped or lowered (80 degrees), which is best for human factors, and 2) the magnitude of the maximum lift effort is only twenty-four pounds (24 lbs.) with the self-camming torque rod 22 compared to thirty pounds (30 lbs.) with the conventional straight torque rod.

The present invention has been described in an illustrative manner. It is to be understood that the terminology, which has been used, is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A self-camming torque rod assembly for an endgate of a vehicle comprising:

a dual-pivot hinge assembly connected to the endgate and a vehicle body of the vehicle and having a dual pivot to allow the endgate to pivot to a first open position and a second open position and to a closed position relative to the vehicle body;

a roller rotatably connected to said dual-pivot hinge assembly; and a self-camming torque rod to interface with said roller having a first portion for connection to the endgate and a second portion extending from the first portion and spaced from said roller when the endgate is in the closed position and cooperating with said roller when said endgate is moved between the closed position and the first open position and the second open position to counterbalance a weight of the endgate.

2. A self-camming torque rod assembly as set forth in claim 1 wherein said second portion comprises a first linear portion extending forwardly and upwardly from said first portion.

3. A self-camming torque rod assembly as set forth in claim 2 wherein said second portion further comprises a second linear portion extending rearwardly and upwardly from said first linear portion.

4. A self-camming torque rod assembly as set forth in claim 3 wherein said second portion further comprises a first arcuate portion interconnecting said first linear portion and said second linear portion.

5. A self-camming torque rod assembly as set forth in claim 4 wherein said second portion further comprises a third linear portion extending forwardly and upwardly from said second linear portion.

6. A self-camming torque rod assembly as set forth in claim 5 wherein said second portion further comprises a second arcuate portion interconnecting said second linear portion and said third linear portion.

7. A self-camming torque rod assembly as set forth in claim 1 wherein said dual-pivot hinge assembly comprises a body bracket for connection to the vehicle body of the vehicle and a universal bracket pivotally connected to said body bracket and for operative connection to the endgate and having said dual pivot.

8. A self-camming torque rod assembly as set forth in claim 7 wherein said universal bracket comprises a body portion extending generally vertically and forming a vertical axis and an endgate portion extending generally horizontally from said body portion and forming a horizontal axis.

9. A self-camming torque rod assembly as set forth in claim 8 wherein said universal bracket includes a hinge arm extending from said body portion and connected to said roller.

10. A self-camming torque rod assembly as set forth in claim 9 wherein said hinge arm includes a top wall and a pair of side walls spaced laterally and extending generally perpendicular from said side walls, said top wall having an aperture extending therethrough to receive said roller.

11. A self-camming torque rod assembly as set forth in claim 10 including a pin extending through said roller and said side walls to rotatably connect said roller to said side walls.

12. A vehicle comprising:

a vehicle body having a rear end with an opening;

an endgate disposed in said opening and operatively cooperating with said vehicle body to open and close said opening;

a dual-pivot hinge assembly connected to said endgate and to said vehicle body and having a dual pivot to allow said endgate to pivot to a first open position and a second open position and to a closed position relative to said door opening, said dual-pivot hinge assembly including a roller rotatably connected thereto; and a self-camming torque rod having a first portion connected to said endgate and a second portion extending from said first portion and spaced from said roller when said endgate is in the closed position and cooperating with said roller when said endgate is moved between the closed position and the first open position and the second open position to counterbalance a weight of said endgate.

13. A vehicle as set forth in claim 12 wherein said second portion comprises a first linear portion extending forwardly and upwardly from said first portion.

14. A vehicle as set forth in claim 13 wherein said second portion further comprises a second linear portion extending rearwardly and upwardly from said first linear portion.

15. A vehicle as set forth in claim 14 wherein said second portion further comprises a first arcuate portion interconnecting said first linear portion and said second linear portion.

16. A vehicle as set forth in claim 15 wherein said second portion further comprises a third linear portion extending forwardly and upwardly from said second linear portion.

17. A vehicle as set forth in claim 16 wherein said second portion further comprises a second arcuate portion interconnecting said second linear portion and said third linear portion.

18. A vehicle as set forth in claim 12 wherein said dual-pivot hinge assembly comprises a body bracket for connection to the vehicle body of the vehicle and a universal bracket pivotally connected to said body bracket and for operative connection to the endgate and having said dual pivot.

19. A vehicle as set forth in claim 18 wherein said universal bracket comprises a body portion extending generally vertically and forming a vertical axis and an endgate portion extending generally horizontally from said body portion and forming a horizontal axis.

20. A vehicle as set forth in claim 19 wherein said universal bracket includes a hinge arm extending from said body portion and connected to said roller.

21. A vehicle as set forth in claim 20 wherein said hinge arm includes a top wall and a pair of side walls spaced laterally and extending generally perpendicular from said side walls, said top wall having an aperture extending therethrough to receive said roller.

22. A vehicle as set forth in claim 21 including a pin extending through said roller and said side walls to rotatably connect said roller to said side walls.

23. A vehicle comprising:

a vehicle body having a rear end with an opening;

an endgate disposed in said opening and operatively cooperating with said vehicle body to open and close said opening;

a dual-pivot hinge assembly comprising a body bracket connected to said vehicle body, a universal bracket pivotally connected to said body bracket and having a dual pivot to allow said endgate to pivot to a first open position and a second open position and to a closed position relative to said vehicle body, and a roller rotatably connected to said universal bracket; and a self-camming torque rod cooperating with said roller to counterbalance a weight of said endgate having a first portion connected to said endgate and a second portion extending from said first portion comprising a first linear portion extending forwardly and upwardly from said first portion, a second linear portion extending rearwardly and upwardly from said first linear portion, a first arcuate portion interconnecting said first linear portion and said second linear portion, a third linear portion extending forwardly and upwardly from said second linear portion, and a second arcuate portion interconnecting said second linear portion and said third linear portion.

* * * * *